US010752801B2

(12) United States Patent
Favresse et al.

(10) Patent No.: US 10,752,801 B2
(45) Date of Patent: Aug. 25, 2020

(54) WETTING AGENTS AND DISPERSANTS HAVING RHEOLOGICAL CHARACTER

(71) Applicant: Evonik Operations GmbH, Essen (DE)

(72) Inventors: Philippe Favresse, Ratingen (DE); Manuela Grewing, Moers (DE); Frank Kleinsteinberg, Alpen (DE); Sandra Roediger, Bochum (DE); Birgit Flock, Essen (DE)

(73) Assignee: Evonik Operations GmbH, Essen (DE)

( * ) Notice: Subject to any disclaimer, the term of this patent is extended or adjusted under 35 U.S.C. 154(b) by 23 days.

(21) Appl. No.: 16/231,666

(22) Filed: Dec. 24, 2018

(65) Prior Publication Data

US 2019/0194488 A1 Jun. 27, 2019

(30) Foreign Application Priority Data

Dec. 27, 2017 (EP) .................................... 17210626

(51) Int. Cl.

| | |
|---|---|
| ***C09D 163/00*** | (2006.01) |
| ***C08G 59/24*** | (2006.01) |
| ***C08G 59/62*** | (2006.01) |
| ***C08G 59/68*** | (2006.01) |
| ***C09D 7/45*** | (2018.01) |
| ***C09D 11/102*** | (2014.01) |
| ***C09D 11/30*** | (2014.01) |
| ***C09D 17/00*** | (2006.01) |
| ***C09D 7/65*** | (2018.01) |
| ***C08G 59/14*** | (2006.01) |

(52) U.S. Cl.

CPC ....... *C09D 163/00* (2013.01); *C08G 59/1444* (2013.01); *C08G 59/1483* (2013.01); *C08G 59/1488* (2013.01); *C08G 59/245* (2013.01); *C08G 59/62* (2013.01); *C08G 59/682* (2013.01); *C08G 59/688* (2013.01); *C09D 7/45* (2018.01); *C09D 7/65* (2018.01); *C09D 11/102* (2013.01); *C09D 11/30* (2013.01); *C09D 17/00* (2013.01)

(58) Field of Classification Search

None

See application file for complete search history.

(56) References Cited

U.S. PATENT DOCUMENTS

| | | | |
|---|---|---|---|
| 4,942,213 A | 7/1990 | Haubennestel et al. | |
| 6,689,731 B2 * | 2/2004 | Esselborn ............ | C08G 65/327 510/276 |
| 7,312,260 B2 | 12/2007 | Krappe et al. | |
| 7,442,724 B2 | 10/2008 | Esselborn et al. | |
| 7,838,603 B2 | 11/2010 | Schwab et al. | |
| 9,115,335 B2 | 8/2015 | Troisin et al. | |
| 9,738,797 B2 | 8/2017 | Nilewski et al. | |
| 9,751,971 B2 | 9/2017 | Veit et al. | |
| 10,010,838 B2 | 7/2018 | Favresse et al. | |
| 10,399,051 B2 | 9/2019 | Favresse et al. | |
| 2005/0020735 A1 * | 1/2005 | Krappe ............... | B01F 17/0064 523/440 |
| 2005/0085563 A1 | 4/2005 | Esselborn et al. | |
| 2006/0089426 A1 * | 4/2006 | Haubennestel .... | C08G 65/2618 523/404 |
| 2008/0221276 A1 | 9/2008 | Schwab et al. | |
| 2011/0144269 A1 | 6/2011 | Kuppert et al. | |
| 2012/0037036 A1 | 2/2012 | Veit et al. | |
| 2012/0157613 A1 | 6/2012 | Poppe et al. | |

(Continued)

FOREIGN PATENT DOCUMENTS

| | | |
|---|---|---|
| EP | 0 318 999 | 6/1989 |
| EP | 1 302 765 | 4/2003 |

(Continued)

OTHER PUBLICATIONS

Crowley et al., "*A Three-Dimensional Approach to Solubility*," Journal of Paint Technology, vol. 38, No. 496, May 1996, pp. 269-280.

(Continued)

*Primary Examiner* — Robert T Butcher

(74) *Attorney, Agent, or Firm* — Grüneberg and Myers PLLC

(57) ABSTRACT

A polyaddition compound and/or a salt thereof is obtainable by the reaction of epoxy resin based on at least one diglycidyl ether of Formula (I)

Formula (I)

wherein R=a divalent aliphatic or monocyclic aromatic or bicyclic aromatic radical or mixtures thereof; with at least one polyether alcohol of Formula (II)

$$R^1\text{-}[OEt]_n\text{-}[OPr]_m\text{-}[OBu]_s\text{-}[OSO]_r\text{-}OH \quad \text{Formula (II)}$$

wherein $R^1$=independently identical or different, linear or branched, optionally aromatic hydrocarbyl radicals having 1 to 18 carbon atoms, [OEt]=ethylene oxide radical, [OPr]=propylene oxide radical, [OBu]=butylene oxide radical, [OSO]=styrene oxide radical, n=0 to 100, m=0 to 50, s=0 to 20, and r=0 to 3, with the proviso that n+m+s+r=3-103, and with at least one compound containing at least one functional group selected from sulfate groups, sulfonate groups, carboxylate groups and phosphate groups.

18 Claims, No Drawings

(56) References Cited

U.S. PATENT DOCUMENTS

| | | | | |
|---|---|---|---|---|
| 2013/0018126 | A1* | 1/2013 | Orth | C08G 59/184 523/400 |
| 2013/0281552 | A1 | 10/2013 | Nilewski et al. | |
| 2014/0194585 | A1 | 7/2014 | Poppe et al. | |
| 2014/0274863 | A1 | 9/2014 | Troisin et al. | |
| 2015/0240020 | A1 | 8/2015 | Veit et al. | |
| 2017/0274335 | A1 | 9/2017 | Favresse et al. | |
| 2017/0292030 | A1 | 10/2017 | Goebelt et al. | |
| 2018/0028994 | A1 | 2/2018 | Favresse et al. | |
| 2018/0094146 | A1 | 4/2018 | Aitha et al. | |
| 2019/0031880 | A1 | 1/2019 | Cavaleiro et al. | |
| 2019/0040205 | A1 | 2/2019 | Knott et al. | |

FOREIGN PATENT DOCUMENTS

| | | |
|---|---|---|
| EP | 1 486 524 | 12/2004 |
| EP | 1 634 940 | 3/2006 |
| EP | 1 745 104 | 1/2007 |
| EP | 2 418 234 | 3/2013 |
| GB | 1 508 576 | 4/1978 |
| GB | 2 108 143 | 5/1983 |
| WO | 93/12187 | 6/1993 |
| WO | 2005/113677 | 12/2005 |
| WO | 2008/074564 | 6/2008 |
| WO | 2010/046181 | 4/2010 |
| WO | 2016/059066 | 4/2016 |

OTHER PUBLICATIONS

Ibert Mellan, "*Compatibility and Solubility*," Noyes Development Corporation, 1968, Table 2.14, pp. 39-40.

U.S. Appl. No. 13/058,372, filed Feb. 10, 2011, 2011/0144269, Kuppert et al.

U.S. Appl. No. 13/393,390, filed Feb. 29, 2012, 2012/0157613, Poppe et al.

U.S. Appl. No. 14/204,459, filed Mar. 11, 2014, 2014/0194585, Poppe et al.

U.S. Appl. No. 13/205,834, filed Aug. 9, 2011, 2012/0037036, Veit et al.

U.S. Appl. No. 15/724,510, filed Oct. 4, 2017, 2018/0094146, Aitha et al.

U.S. Appl. No. 16/044,960, filed Jul. 25, 2018, 2019/0031880, Cavaleiro et al.

U.S. Appl. No. 16/029,987, filed Jul. 9, 2018, 2019/0040205, Knott et al.

* cited by examiner

WETTING AGENTS AND DISPERSANTS HAVING RHEOLOGICAL CHARACTER

CROSS-REFERENCE TO RELATED APPLICATIONS

The present application claims priority to European patent application EP 17210626.2 filed Dec. 27, 2017, the content of which is incorporated by reference in its entirety.

FIELD OF THE INVENTION

The present invention relates to polyaddition compounds and salts thereof, to preparation processes therefor and their use as wetting agents and dispersants having rheological character.

DESCRIPTION OF RELATED ART

There is a multitude of different known substances that nowadays find use as wetting agents and dispersants for pigments and/or fillers.

In order to introduce pigments and/or fillers into liquid media, high mechanical forces are necessary. However, pigments and fillers have a tendency to reagglomerate again after the dispersion process due to mutual attraction forces, which negates the dispersion energy previously expended and leads to serious application-related problems.

It is known that dispersants can be used to facilitate the incorporation of pigments and fillers. These are surface-active substances, also called surfactants or macrosurfactants. These substances, in small amounts, are either applied directly to the solid or added to the dispersion medium.

The prior art also discloses polymeric wetting agents and dispersants which firstly contain groups having pigment affinity, such as carboxyl, amino or phenyl functionalities, and secondly contain side chains soluble in the medium. The groups having pigment affinity are supposed to have a rapid orientation to the surface of pigments and a high permanence thereon. Side chains ensure the compatibility with the dispersion medium and steric stabilization of the dispersed phase.

In the production of pigment preparations, for example, dispersants are used, and these physically stabilize pigment particles in their finely divided form in an aqueous or aqueous/organic medium. For the selection of the dispersants, in addition, compatibility in the various application media is essential.

An overview of the various dispersants can be found in EP 0 318 999. For example, as well as simple low molecular weight compounds such as lecithin, fatty acids and salts thereof and alkylphenol ethoxylates, complex structures are also used as wetting agents and dispersants.

EP 1 486 524 A1 describes the preparation of epoxy-amine adducts and salts thereof and their use as dispersants. These are obtainable by the reaction of mono- or polyfunctional aromatic epoxides with polyoxyalkylenemonoamines.

EP 1 745 104 A1 discloses comb-type polyetheralkanolamines as dispersants for inks and printing inks. WO 2016/059066 describes comb copolymers based on epoxy-amine adducts.

It has additionally been observed that deflocculated particles have a stronger tendency to settle out than agglomerated substances. Especially in the case of heavy materials such as zinc dust and metal oxides, this can lead to unwanted hard settling. In order to counteract this phenomenon, the rheology of the pigment concentrate has to be modified. Therefore, rheology additives are used additionally in order to achieve thixotropic characteristics with an elasticity component.

The additive itself must not worsen the coating properties. Instead, it should enhance the function of the pigment in the coating system in each case. Losses of gloss and shifts in hue in paints and coatings and inadequate evolution of colouring power should be avoided.

Typical thickeners for aqueous systems are, for example, cellulose derivatives (for example methyl cellulose, ethyl hydroxypropyl cellulose) or polyacrylates, and are generally used in emulsion paints. Polyurethane thickeners (associative thickeners) having more favourable levelling properties are also increasingly being used in Formulations.

A large number of rheological additives for solvent-based systems are commercially available, for example hydrogenated castor oils, fumed silica, modified ureas and modified montmorillonites (organo-clays, bentonite).

The rheological effect of the above additives is based on the fact that three-dimensional network structures are formed via hydrogen bonds in paint Formulations. These three-dimensional network structures are destroyed by the introduction of shear forces, but form again when shearing of the paint Formulation ceases, even if this reformation does not occur immediately. However, the rising viscosity over time enables at first a levelling of the surface and prevents settling of the pigments and solids. This time-dependent change in viscosity is referred to as thixotropy. In paints, thixotropy is more desirable than purely structurally viscous flow characteristics because it allows a compromise between settling of the pigments or fillers and levelling of the paint.

Conventional wetting agents and dispersions are unable to combine dispersion properties and rheological properties in one additive. There is thus a need for wetting agents and dispersants that allow dispersion properties in aqueous and/or solventborne systems, but accordingly also have a yield point.

BRIEF SUMMARY OF THE INVENTION

The problem addressed by the present invention is therefore that of providing compounds that are suitable as dispersants and additionally have rheological properties in aqueous and/or solventborne systems, such that the solids do not settle out to a significant degree and have no shortcomings in the technical application tests, such as colour strength or rub-out.

To solve the problem, polyaddition compounds and salts thereof of the type specified at the outset are proposed, which are obtainable by the reaction of epoxy resin based on at least one diglycidyl ether of the Formula (I)

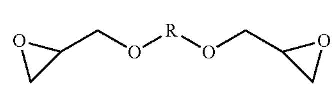

with R=a divalent aliphatic or monocyclic aromatic or bicyclic aromatic radical or mixtures thereof with at least one polyether alcohol of the general Formula (II)

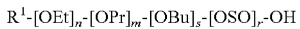

$R^1$-$[OEt]_n$-$[OPr]_m$-$[OBu]_s$-$[OSO]_r$-OH    Formula (II)

with $R^1$=independently identical or different, linear or branched, optionally aromatic hydrocarbyl radicals having 1 to 18 carbon atoms, preferably methyl, butyl, octyl, decyl, dodecyl, tetradecyl, octadecyl or mixtures thereof,
with [OEt]=ethylene oxide radical,
with [OPr]=propylene oxide radical,
with [OBu]=butylene oxide radical,
with [OSO]=styrene oxide radical,
with n=0 to 100, preferably n=1-80, more preferably n=10-50,
m=0 to 50, preferably m=0-35, more preferably m=0-25,
s=0 to 20, preferably s=0-15, more preferably s=0-10 and r=0 to 3,
with the proviso that n+m+s+r=3-103, preferably n+m+s+r=4-60, more preferably n+m+s+r=5-40,
and
with at least one compound containing at least one functional group selected from sulfate groups, sulfonate groups, carboxylate groups and phosphate groups.

DETAILED DESCRIPTION OF THE INVENTION

It has been found that polyaddition compounds according to the invention and salts thereof can especially be used as wetting agents and dispersants having rheological character both for aqueous and solventborne systems.

It is suspected that these universal properties result from the reaction of free OH groups of polyether alcohols of Formula (II) with functional groups, such as the sulfate group, the sulfonate group, the carboxylate group or the phosphate group.

Advantageously, polyaddition compounds according to the invention and salts thereof can be prepared on an amine-free basis, avoiding the possible formation of nitrosamines.

Epoxy resins are obtained, for example, from the reaction of an epoxy compound, for example epichlorohydrin, with a polyfunctional alcohol, i.e. a diol, triol or polyol. According to the used reaction process, the reaction of polyfunctional alcohols with an epoxy compound, for example epichlorohydrin, also gives rise to the corresponding hydroxyl/epoxy compounds in different concentrations as by-products. These can be isolated by standard separating operations. The product mixture obtained in the glycidylization reaction of polyols may consist of polyol that has been fully and partly converted to the glycidyl ether.

Particular preference is given to epoxy resins based on diglycidyl ethers of bisphenol A (BADGE), bisphenol F or bisphenol A/F. These epoxy resins are commercially available on a large scale. They can be obtained from the reaction of bisphenol A, bisphenol F or mixtures of bisphenol A and bisphenol F (also referred to as bisphenol A/F) with epichlorohydrin. According to the reaction process, it is possible to prepare reaction products of high or low molecular weight.

Preference is given to diglycidyl ethers of the Formula (I) selected from diglycidyl ethers of difunctional saturated or unsaturated, branched or unbranched, cyclic or open-chain C2-C30 alcohols, for example ethylene glycol, butanediol, hexanediol, octanediol glycidyl ether, cyclohexanedimethanol diglycidyl ether, neopentyl glycol diglycidyl ether, diglycidyl ethers of difunctional polyether polyols of low to high molecular weight, for example polyethylene glycol diglycidyl ethers, polypropylene glycol diglycidyl ethers, diglycidyl ethers of difunctional diphenols and optionally triphenols, where the latter is understood to mean not just pure phenols but optionally also substituted phenols. The manner of substitution may be very varied. More particularly, this is preferably understood to mean substitution directly on the aromatic ring to which the phenolic OH group is bonded. Phenols are also understood to mean not just monocyclic aromatics but also polycyclic or fused aromatics or heteroaromatics having the phenolic OH group directly on the aromatic or heteroaromatic system.

Particularly preferred bisphenols and, if appropriate, triphenols are selected from 1,4-dihydroxybenzene, 1,3-dihydroxybenzene, 1,2-dihydroxybenzene, 1,3-dihydroxytoluene, 3,5-dihydroxybenzoate, 2,2-bis(4-hydroxyphenyl) propane (bisphenol A), bis(4-hydroxyphenyl)methane (bisphenol F), bis(4-hydroxyphenyl) sulfone (bisphenol S), naphthoresorcinol, dihydroxynaphthalene, dihydroxyanthraquinone, dihydroxybiphenyl, 3,3-bis(p-hydroxyphenyl) phthalide, 5,5-bis(4-hydroxyphenyl)hexahydro-4,7-methanoindane, phenolphthalein, fluorescein, 4,4'-[bis (hydroxyphenyl)-1,3-phenylenebis(1-methylethylidene)] (bisphenol M), 4,4'-[bis(hydroxyphenyl)-1,4-phenylenebis (1-methylethylidene)] (bisphenol P), 2,2'-diallyl bisphenol A, diphenols and dicresols prepared by reaction of phenols or cresols with diisopropylidenebenzene, phloroglucinol, gallic esters, phenol or cresol novolaks with OH functionality of 2.0 to 3.5, and all isomers of the aforementioned compounds.

It is likewise conceivable to use diglycidyl ethers of the Formula (A-I), called liquid epoxy resins, or of the Formula (A-II), called solid epoxy resins.

(A-I)

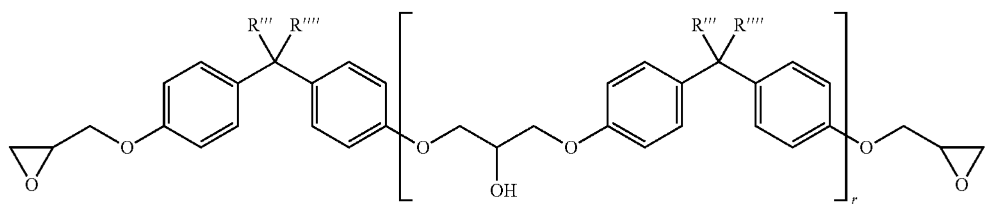

-continued (A-II)

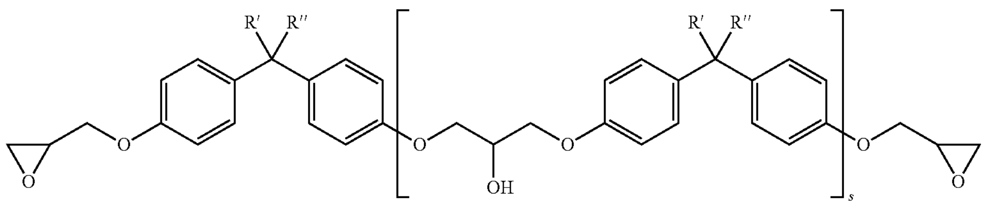

In these Formulae, the substituents R', R", R''' and R'''' are independently either H or $CH_3$. In addition, the index r has a value of 0 to 1. Preferably, r has a value of less than 0.2. In addition, the index s has a value of >1, especially >1.5, especially from 2 to 12. Compounds of the Formula (A-II) having an index s between 1 and 1.5 are referred to by the person skilled in the art as semisolid epoxy resins. However, preference is given to solid epoxy resins in the narrower sense, i.e. where the index s has a value of >1.5. Solid epoxy resins of this kind are commercially available, for example from Dow or Huntsman or Hexion. Commercially available liquid epoxy resins of the Formula (A-I) have already been mentioned above.

More preferably, the diglycidyl ether of the Formula (I) is a liquid epoxy resin, especially a diglycidyl ether of bisphenol A (BADGE), of bisphenol F or of bisphenol A/F.

Preferably, the [OEt], [OPr], [OBu], [OSO] radicals, also called alkylene oxide units, in the polyether alcohol of the general Formula (II) may be arranged in any sequence. This especially includes a random sequence or arrangement in the form of [OEt], [OPr], [OBu] and/or [OSO] blocks or an arrangement in the form of a gradient, for example an enrichment or depletion of [OEt] or the other alkoxy units along the polyalkylene oxide chain.

More preferably, n≥m>s>r. Most preferably, s=0.

Alkylene oxide units are preferably selected from ethylene oxide, propylene oxide, butylene oxide and styrene oxide units, among which preference is given to ethylene oxide and propylene oxide units.

If more than one alkylene oxide unit is present in the alkylene oxide radical, this is referred to as a polyalkylene oxide radical. Polyalkylene oxide radicals therefore contain preferably 4 to 60, more preferably 5 to 40, alkylene oxide units.

More preferably, the R radical of the Formula (II) is a cyclic, aliphatic or aromatic radical that may or may not have been hydrogenated. In principle, all aromatic and aliphatic radicals are possible.

Preferably, the preparation of the polyaddition compounds according to the invention and salts thereof is conducted in the presence of reaction catalysts. These particularly enable the reaction of the epoxy resin of Formula (I) with the polyether alcohol of Formula (II).

Preferably, reaction catalysts are selected from sodium hydroxide, potassium hydroxide, lithium hydroxide, barium hydroxide, strontium hydroxide, alkali metal alkoxides such as sodium methoxide, potassium ethoxide, lithium methoxide, sodium ethoxide and potassium dodecoxide, and the alkali metal salts of carboxylic acids, for example sodium stearate and lithium stearate, inorganic and organic protic acids, for example phosphoric acid, tetrafluoroboric acid and benzenesulfonic acid, Lewis acids and complexes thereof, such as tin(IV) chloride, titanium(IV) chloride, titanium(IV) isopropoxide, triethyloxonium tetrafluoroborate and aliphatic, cycloaliphatic, araliphatic amines, and also nitrogen heterocycles, tertiary amines such as N,N-dimethylbenzylamine, quaternary ammonium salts, for example tetramethylammonium chloride.

Preferably, compounds containing functional groups are selected from sulfuric acid, chlorosulfonic acid and sulfur trioxide for the formation of sulfate groups, polyphosphoric acid, phosphoric acid, phosphorus pentoxide and phosphorus pentachloride for the formation of phosphate groups, acid anhydride and chloroacetic acid for the formation of carboxylate groups, propane sultone, butane sultone and 3-chloro-2-hydroxypropanesulfonic acid for the formation of sulfonate groups, and/or salts thereof.

The present invention further provides a process for preparing polyaddition compounds according to the invention and salts thereof, wherein epoxy resins based on at least one diglycidyl ether of the Formula (I)

Formula (I)

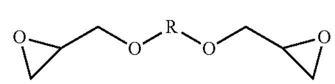

with R=a divalent aliphatic or monocyclic aromatic or bicyclic aromatic radical or mixtures thereof are reacted with at least one polyether alcohol of the general Formula (II)

$$R^1\text{-[OEt]}_n\text{-[OPr]}_m\text{-[OBu]}_s\text{-[OSO]}_r\text{-OH} \quad \text{Formula (II)}$$

with $R^1$=independently identical or different, linear or branched, optionally aromatic hydrocarbyl radicals having 1 to 18 carbon atoms, preferably methyl, butyl, octyl, decyl, dodecyl, tetradecyl, octadecyl or mixtures thereof, with [OEt]=ethylene oxide radical, with [OPr]=propylene oxide radical, with [OBu]=butylene oxide radical, with [OSO]=styrene oxide radical, with n=0 to 100, preferably n=1-80, more preferably n=10-50, m=0 to 50, preferably m=0-35, more preferably m=0-25, s=0 to 20, preferably s=0-15, more preferably s=0-10 and r=0 to 3, with the proviso that n+m+s+r=3-103, preferably n+m+s+r=4-60, more preferably n+m+s+r=5-40, at a temperature between 25° C. and 300° C., preferably 40° C. and 200° C., more preferably 50° C. and 100° C., then reacted with at least one compound containing at least one functional group selected from sulfate groups, sulfonate groups, carboxylate groups and phosphate groups.

In this process, preferably either the epoxy resins of Formula (I) and polyether alcohols of Formula (II) are initially charged and heated to the reaction temperature, or polyether alcohols of Formula (II) are first initially charged and the epoxy resins of Formula (I) are added as a mixture or sequentially or metered in over a period of time.

In order to ensure partial or complete conversion of epoxy resins of Formula (I) and polyether alcohols of Formula (II), the molar ratio of the two compounds to one another should be considered. The basis used here are epoxy groups of diglycidyl ethers according to Formula (I) and OH groups of polyether alcohols according to Formula (II).

Preferably, the molar ratio of epoxy groups of diglycidyl ether of the Formula (I) to OH groups of polyether alcohols of the Formula (II) is 1.0:0.5 to 1.0:4.0, preferably 1.0:1.0 to 1.0:2.0.

Preferably, compounds containing functional groups are selected from sulfuric acid, chlorosulfonic acid and sulfur trioxide for the formation of sulfate groups, polyphosphoric acid, phosphoric acid, phosphorus pentoxide and phosphorus pentachloride for the formation of phosphate groups, acid anhydride and chloroacetic acid for the formation of carboxylate groups, propane sultone, butane sultone and 3-chloro-2-hydroxypropanesulfonic acid for the formation of sulfonate groups, and/or salts thereof.

For example, it is possible with preference to introduce anionic groups into the polyaddition compounds according to the invention and salts thereof by producing these proceeding from free OH groups of the polyether alcohols of Formula (II). Sulfonate groups can be introduced by vinyl addition or substitution reaction, with production of corresponding spacers OX. Alternatively, the free OH group can also be converted to a chloride beforehand, which is then amenable to a direct sulfonation. Carboxylates can be obtained, for example, by reaction with chloroacetate, anhydrides, acrylate or substituted acrylates H 2C═(R')C(0) 0<"> where R' is H or an alkyl radical having 1 to 4 carbon atoms. In principle, the anionic group, which is a sulfate, a sulfonate, a carboxylate or a phosphate group, and the spacer OX, which in the simplest case (o=0) can be a single bond, form a single unit.

In the case of a sulfate group, it is possible to make use, for example, of the reaction with sulfuric acid, chlorosulfonic acid or sulfur trioxide in a falling-film evaporator with subsequent neutralization.

In the case of a sulfonate group, for example, it is possible to make use of the reaction with propane sultone and subsequent neutralization, with butane sultone and subsequent neutralization, with sodium vinylsulfonate, or with sodium 3-chloro-2-hydroxypropanesulfonate. For preparation of sulfonates, it is also possible to convert the terminal OH group to a chloride, for example with phosgene or thionyl chloride, and then to react it, for example, with sulfite.

In the case of a carboxylate group, it is possible to make use, for example, of the oxidation of the alcohol with oxygen and subsequent neutralization or reaction with sodium chloroacetate or anhydrides. Carboxylates can also be obtained, for example, by Michael addition of (meth)acrylic acid or esters.

Phosphates can be obtained, for example, by esterification reaction with phosphoric acid, phosphorus pentachloride, phosphorus pentoxide or polyphosphoric acid.

Preferably, the process according to the invention is conducted in the presence of reaction catalysts. In this case, the reaction catalyst is preferably added to the reaction mixture in order to catalyse the reaction between OH groups and epoxy groups.

The reaction is preferably run until the conversion is complete. The conversion can be determined by means of NMR or by means of the determination of the epoxy equivalent according to DIN ISO 16945 according to the field of application, and so the conversion is freely adjustable from partial to complete conversion.

Preferably, useful reaction catalysts are selected from sodium hydroxide, potassium hydroxide, lithium hydroxide, barium hydroxide, strontium hydroxide, alkali metal alkoxides such as sodium methoxide, potassium ethoxide, lithium methoxide, sodium ethoxide and potassium dodecoxide, and the alkali metal salts of carboxylic acids, for example sodium stearate and lithium stearate, inorganic and organic protic acids, for example phosphoric acid, tetrafluoroboric acid and benzenesulfonic acid, Lewis acids and complexes thereof, such as tin(IV) chloride, titanium(IV) chloride, titanium(IV) isopropoxide, triethyloxonium tetrafluoroborate and aliphatic, cycloaliphatic, araliphatic amines, and also nitrogen heterocycles, tertiary amines such as N,N-dimethylbenzylamine, quaternary ammonium salts, for example tetramethylammonium chloride.

Preferably, diglycidyl ethers of the Formula (I) are selected from diglycidyl ethers of difunctional saturated or unsaturated, branched or unbranched, cyclic or open-chain C2-C30 alcohols, selected from ethylene glycol, butanediol, hexanediol, octanediol glycidyl ethers, cyclohexanedimethanol diglycidyl ethers and neopentyl glycol diglycidyl ethers, from diglycidyl ethers of difunctional polyether polyols of low to high molecular weight, selected from polyethylene glycol diglycidyl ethers or polypropylene glycol diglycidyl ethers, or from diglycidyl ethers of difunctional unsubstituted or substituted, monocyclic, polycyclic and/or fused diphenols or triphenols selected from 1,4-dihydroxybenzene, 1,3-dihydroxybenzene, 1,2-dihydroxybenzene, 1,3-dihydroxytoluene, 3,5-dihydroxybenzoate, 2,2-bis(4-hydroxyphenyl)propane (=bisphenol A), bis(4-hydroxyphenyl)methane (=bisphenol F), bis(4-hydroxyphenyl) sulfone (=bisphenol S), naphthoresorcinol, dihydroxynaphthalene, dihydroxyanthraquinone, dihydroxybiphenyl, 3,3-bis(p-hydroxyphenyl)phthalide, 5,5-bis(4-hydroxyphenyl)hexahydro-4,7-methanoindane, phenolphthalein, fluorescein, 4,4'-[bis(hydroxyphenyl)-1,3-phenylenebis(1-methylethylidene)] (=bisphenol M), 4,4'-[bis(hydroxyphenyl)-1,4-phenylenebis(1-methylethylidene)] (=bisphenol P), 2,2'-diallyl bisphenol A.

Preferably, a neutralization step may be conducted after the reaction.

Astonishingly, it has been found that the polyaddition compounds according to the invention and salts thereof have a yield point in aqueous and/or solventborne systems. This property accordingly not only allows optimal dispersion of pigment and/or solids in corresponding Formulations but also suppresses settling of the pigments and/or solids. There is thus no need for costly and inconvenient incorporation of organic or inorganic rheological additives.

According to DIN 1342-1, "Viscosity—Rheological Concepts", point 3.18, the yield point is defined as the lowest shear stress above which a plastic material has rheological behaviour like a liquid. In addition, the definition of a plastic substance according to DIN 1342-3, point 4.3 is as follows: A deformable substance is called plastic when it behaves like a rigid, elastic or viscoelastic solid in a range of relatively low shear stress, but like a liquid in a range of relatively high shear stress. The shear stress at which this transition takes place is referred to as the yield point (also called yield stress).

The yield point can be determined by the recording of a flow curve with a rheometer. The value obtained is highly dependent on the sensitivity of the instrument and the time parameters for the measurement procedure (loading rate) on which the measurement is based. This is the case irrespective of whether the measurement is performed with a shear stress-controlled or speed-controlled viscometer. Short timescales (rapid increase in loads) generally result in higher values for the yield point. Better results for the yield point are obtained when the shear stress can be recorded at sufficiently low rates of deformation (and low deformations) that an evaluation of the shear stress is possible as a function of deformation (or vice versa) (source: Römpp 2005—Fließgrenze [yield point]—Sieghard Millow). According to DIN Fachbericht [Technical Report] No. 143 from NPF/NAB 21.1 "Rheologie" (Pigment und Füllstoffe) [Rheology (Pigments and Fillers)], and yield point values can be determined by the tangent intersection method.

In addition, the invention further provides a composition comprising at least one particulate solid and the polyaddition compounds according to the invention and/or salts thereof. These can be used for production of aqueous and/or solventborne systems.

Preferably, the composition according to the invention, in the form of aqueous and/or solventborne systems, has a yield point.

Preferably, the yield point of the aqueous and/or solventborne systems, determined to according to DIN 1342-1 2003 11 and DIN Fachbericht 143, has a value of $\tau$ in PA=0.1-400, preferably $\tau$ in PA=0.1-100, more preferably $\tau$ in PA=0.1-50.

Preferably, the composition of the invention, in the form of aqueous and/or solventborne systems, does not have any sediment after storage at room temperature for 24 h.

Preferably, the composition of the invention, in the form of aqueous and/or solventborne systems, has an anti-floating effect.

Commercial paint Formulations are mono-pigmented only in exceptional cases; generally, mixtures of two or more different pigments will be involved. In such systems too, all pigments should be well-wetted and as far as possible be deflocculated and distributed homogeneously throughout the paint film.

But if this mixture is disrupted because the pigments separate, this results in changes in hue in the paint. This defect is designated as "floating".

One of the causes of the separation of the pigments is flow phenomena in the drying paint film. During the phase of drying of a paint film, solvent has to be transported out of the lower paint layers to the surface; in the course of evaporation, there is an increase in the density of the remaining material (for example pigments) and it falls back downward.

In addition, in the course of evaporation, cooling effects occur and the surface tension changes. All this leads to formation of vortex currents arranged in the form of more or less uniform hexagonal cells (called Benard cells). The paint material rises upward in the centre of the cells, then is distributed across the surface and flows back downward at the cell boundaries. These cell flows have long been known—not just in paint—and occur in every liquid paint film (even if unpigmented). In a pigmented system, pigments are now also involved in these vortex flows and, assuming that the mobility of the different pigments is similar, they are also transported in a very similar manner in the vortices and there is no separation. But if there is a distinct difference in the pigment mobilities, the transport characteristics are also different and there can be separation.

The separation of the pigments is closely related to the different pigment mobility. Pigments are involved in these movements and, if they differ in mobility, the result can be separation and hence floating.

These differences in mobility can be balanced out by use of the polyaddition compounds according to the invention and salts thereof.

Preferably, the composition according to the invention can be used for production of dispersions, millbases, paints, varnishes or printing inks, inkjet inks, grinding resins or pigment concentrates.

The invention also provides for the use of the polyaddition compounds according to the invention and salts thereof as wetting agents or dispersants, as dispersion stabilizers, as anti-settling agents, as rheology additive, as coating compositions.

The present invention likewise provides a dispersion comprising polyaddition compounds according to the invention and salts thereof as dispersant, a particulate solid and an organic medium and/or an aqueous medium.

The solid present in the dispersion may be any inorganic or organic solid material which is essentially insoluble in the organic medium at the temperature in question and which is to be stabilized in a finely divided form therein.

Examples of suitable solids are pigments for solvent-based inks, pigments; extenders and fillers for inks and polymer materials; dyes, especially disperse dyes; optical brighteners and textile additives for solvent dying baths, inks and other solvent-based application systems; solids for oil-based and invert emulsion drilling muds; soil and solid particles in dry-cleaning fluids; particulate ceramic materials; magnetic materials and magnetic recording media and biocides, agrochemicals and pharmaceuticals which are used as dispersions in organic media.

A preferred solid is a pigment from any of the recognized classes of pigments which are described, for example, in Third Edition of the Colour Index (1971) and subsequent revisions and supplements in the chapter entitled "Pigments". Examples of inorganic pigments are titanium dioxide, zinc oxide, Prussian blue, cadmium sulfide, iron oxides, vermilion, ultramarine and the chromium pigments, including chromates, molybdates and mixed chromates and sulfates of lead, zinc, barium, calcium and mixtures and modifications thereof, which are commercially available as greenish-yellow to red pigments under the primrose chrome, lemon/middle chrome, orange chrome, scarlet chrome and red chrome names. Examples of organic pigments are those from the group of the azo, diazo, condensed azo, thioindigo, indanthrone, isoindanthrone, anthanthrone, anthraquinone, isodibenzanthrone, triphendioxazine, quinacridone and phthalocyanine pigments, especially copper phthalocyanine and the ring-halogenated derivatives thereof, and also varnishes composed of acidic, basic and mordant dyes. Even though it is strictly inorganic, carbon black behaves more like an organic pigment with regard to its dispersion properties. Preferred organic pigments are phthalocyanine pigments, especially copper phthalocyanine, and monoazo, disazo, indanthrone, anthanthrone, quinacridone and carbon black pigments.

Further preferred solids are extenders and fillers, such as talc, kaolin, silicon dioxide, baryte and chalk; particulate ceramic materials, such as aluminium oxide, silicon dioxide, zirconium dioxide, titanium dioxide, silicon nitride, boron nitride, silicon carbide, boron carbide, mixed silicon aluminium nitrides and metal titanates, particulate magnetic materials, such as the magnetic oxides of transition metals, especially iron and chromium, e.g. gamma-$Fe_2O_3$, $Fe_3O_4$ and cobalt-doped iron oxides, calcium oxide, ferrites, especially barium ferrites, and metal particles, especially metallic iron, nickel, cobalt and alloys thereof, and agrochemicals, for example the fungicides flutriafen, carbendazim, chlorthalonil and mancozeb.

The aqueous or organic medium present in the dispersions of the invention is preferably a polar organic medium or an essentially nonpolar aliphatic or aromatic hydrocarbon or halogenated hydrocarbon. The term "polar" in relation to the organic medium means an organic liquid or resin capable of forming moderate to strong bonds, as described in the article entitled "A Three Dimensional Approach to Solubility" by Crowley et al. in Journal of Paint Technology, volume 38, 1966, on page 269. Such organic media generally have a hydrogen bonding number of 5 or more, as defined in the above-cited article.

Examples of suitable polar organic media are amines, ethers, especially lower alkyl ethers, organic acids, esters, ketones, glycols, alcohols and amides. Numerous specific examples of such moderately strongly hydrogen-bonding liquids are specified in the book entitled "Compatibility and Solubility" by Ibert Mellan (published in 1968 by Noyes Development Corporation) in Table 2.14 on pages 39-40. The liquids stated in the publication all fall within the range of the term for a polar organic medium, and are therefore part of the present disclosure.

Preferred polar organic liquids are dialkyl ketones, alkyl esters of alkanecarboxylic acids and alkanols, especially those liquids which contain up to and including a total number of 6 carbon atoms. Particularly preferred organic media are dialkyl and cycloalkyl ketones, such as acetone, methyl ethyl ketone, diethyl ketone, diisopropyl ketone, methyl isobutyl ketone, diisobutyl ketone, methyl isoamyl ketone, methyl n-amyl ketone and cyclohexanone; alkyl esters, such as methyl acetate, ethyl acetate, isopropyl acetate, butyl acetate, ethyl formate, methyl propionate, methoxypropyl acetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate, alkanols, such as methanol, ethanol, n-propanol, isopropanol, n-butanol and isobutanol, and dialkyl ethers and cyclic ethers, such as diethyl ether and tetrahydrofuran.

The essentially nonpolar media which can be used either alone or in a mixture with the aforementioned polar solvents are aliphatic or aromatic hydrocarbons, such as toluene and xylene, and halogenated aliphatic and aromatic hydrocarbons, such as trichloroethylene, perchloroethylene and chlorobenzene.

Examples of suitable polar resins as medium for the dispersion form of the present invention are those film-forming resins which are suitable for the preparation of liquid inks, paints and chips for use in numerous applications such as paints and liquid inks. Examples of such resins include polyamides, such as Versamid® from the BASF SE Company, for example, or cellulose ethers, such as ethylcellulose and ethylhydroxyethylcellulose. Examples of paint resins include short-oil alkyd/melamine-formaldehyde resins, polyester/melamine-formaldehyde resins, thermosetting acrylic/melamine-formaldehyde resins, long-oil alkyd resins, and multi-layer resins such as acrylic and urea/aldehyde resins.

The dispersion may if desired comprise other constituents, examples being resins (if they do not already constitute the organic medium), binders, liquefying agents (such as those described in GB-A-1508576 and GB-A-2108143), plasticizing agents, levelling agents and preservatives.

Preferably, the polyaddition compounds according to the invention and/or salts thereof are used in an amount of 0.1% to 10.0% by weight, more preferably 0.3% to 4.5% by weight and most preferably 0.5% to 4.0% by weight, based on the total weight of the dispersion.

Preferably, the dispersion of the invention takes the form of an ink or coating composition, inkjet ink, especially of a printing ink or varnish or architectural paint.

Further fields of use are conceivable, for example in the production or processing of varnishes, printing inks, architectural paints, paper coating slips, leather and textile dyes, pastes, pigment concentrates, inkjet inks, ceramic materials or cosmetic Formulations, especially when these products contain particulate solids such as pigments and/or fillers.

Polyaddition compounds according to the invention and salts thereof can be used for production of solids concentrates, such as pigment concentrates. For this purpose, they are initially charged in a carrier medium such as organic solvents, plasticizers and/or water, and the solids to be dispersed are added while stirring. In addition, these concentrates may comprise binders and/or other auxiliaries. However, it is especially also possible with polyaddition compounds according to the invention and salts thereof to produce stable binder-free pigment concentrates that do not form any sediment over time. It is likewise possible to use polyaddition compounds according to the invention and salts thereof to produce free-flowing solids concentrates from pigment presscakes. In this case, polyaddition compounds according to the invention and salts thereof are mixed into the presscake which may still contain organic solvents, plasticizers and/or water, and the mixture thus obtained is dispersed. Solid concentrates that have been produced in various ways can then be incorporated into different substrates, for example alkyd resins, polyester resins, acrylate resins, polyurethane resins or epoxy resins. Particulate solids, but especially pigments and/or fillers, may alternatively be dispersed in a solvent-free manner directly in the polymers and in that case are particularly suitable for pigmentation of thermoplastic and thermoset polymer Formulations.

The invention therefore also relates to a particle Formulation comprising 5.0% to 99.9% by weight of one or more particulate solids and 0.1% to 95.0% by weight of one or more polyaddition compounds according to the invention and salts thereof, based on the total weight of the particle Formulation. Particle Formulations are preferably pigment Formulations or pigment/filler Formulations, also referred to as pigment preparations or pigment/filler preparations. Particulate solids, especially the pigments and/or fillers, are present in aforementioned Formulations or preparations typically in a higher concentration than in the later applications. The carrier material used for particulate solids may in the simplest case be polyaddition compounds according to the invention and salts thereof, such that, in such a case, preparations consist to an extent of 5.0% to 99.9% by weight of one or more particulate solids and 0.1% to 95.0% by weight of one or more polymers according to the invention. However, particle Formulations may also comprise binders other than the wetting agent and the dispersant, including other additives and/or organic solvents and/or water. Particle Formulations may be in solid form, for example in the form of powder, chips or granules, or in liquid form. Liquid pigment preparations or pigment/filler preparations, depending on the pigment content or pigment and filler content, are also referred to as colour concentrates, pigment pastes, full-tone pastes, shading or tinting pastes, or pigment doughs.

Particle Formulations according to the invention, especially pigment Formulations or pigment/filler Formulations, are preferably used in the production of coating materials, printing inks and plastics.

This technology of pigment concentrates can be extended to other substances, such as to flatting agents, functional fillers, anticorrosion pigments, active biocidal ingredients such as copper oxide, zinc dust and others. This enables novel Formulation concepts, the full potential of which is yet to be exhausted. The terms “pigments” and “pigment concentrates” thus also relate to non-colouring substances.

Polyaddition compounds according to the invention and salts thereof can advantageously also be used in the production of inks for non-impact printing methods such as thermal inkjet and the bubble-jet method. These inks may, for example, be aqueous ink Formulations, solvent-based ink Formulations, solvent-free or low-solvent inks for UV applications, or else wax-containing inks.

Polyaddition compounds according to the invention and salts thereof can advantageously also be used in the production of colour filters for liquid-crystal displays and screens, colour resolution devices, sensors, plasma screens, surface conduction electron emitter displays (SEDs) and for MLCCs (multilayer ceramic capacitors). In this case, the liquid colour filter varnish, which is also referred to as colour resist, can be applied by a wide variety of different application methods such as spin-coating, knife-coating, combinations of the two methods, or via non-impact printing methods, for example inkjet methods. MLCC technology is used in the production of microchips and printed circuit boards.

Polyaddition compounds according to the invention and salts thereof can also be used for production of cosmetic Formulations, for example makeup, face powder, lipstick, hair colourants, creams, nail varnishes and sunscreen preparations. These may take the customary forms, for example of W/O or O/W emulsions (water-in-oil or oil-in-water emulsions), solutions, gels, creams, lotions or sprays.

The dispersant according to the invention may finally also be used for production of a pigmented coating on a substrate, wherein a pigmented coating material is applied to the substrate and wherein the pigmented coating material that has been applied to the substrate is baked or cured or crosslinked in some other way.

Another possible use of polyaddition compounds according to the invention and salts thereof is that of production of dispersible solids in the form of powder particles and/or fibre particles, especially of dispersible pigments or fillers, especially polymeric fillers, wherein particles have been coated with the polymer according to the invention. Such coatings of organic or else inorganic solids are executed in a known manner. In this case, the solvent or emulsifying agent can either be removed or can remain in the mixture to form pastes. These pastes are standard commercial products and may additionally comprise binder components and further auxiliaries and additives. Specifically in the case of pigments, the pigment surface can be coated during or after the synthesis of the pigments, for example by addition of the copolymers to the pigment suspension, or during or after the pigment finishing. The pigments that have been pre-treated in this way, as compared with untreated pigments, are notable for easier processibility and for improved viscosity, flocculation and gloss characteristics, and for higher colour strength.

Examples of inorganic pigments that are suitable in the context of the present invention are oxide pigments and oxide hydroxide pigments and complex inorganic pigments, for example titanium dioxide pigments, iron oxide pigments, chromium oxide pigments, bismuth vanadate pigments, complex inorganic chromatic pigments, for example with rutile or spinel lattice, or ceramic oxide colour solids, sulfide pigments and sulfide selenide pigments, for example zinc sulfide pigments, and cadmium pigments, lead chromate pigments, for example chromium yellow pigments, molybdate red pigments and chromium green and true chromium green pigments, complex salt pigments, for example cyanide pigments (iron blue), silicate pigments, for example ultramarine pigments; effect pigments, for example platelet-type aluminium pigments, gold bronze pigments and zinc pigments, pearlescent pigments, effect pigments based on iron oxide, metal-based effect pigments, colour-variable pigments and cholesteric effect pigments, anticorrosion pigments, for example zinc dust, phosphate pigments, zinc oxide/zinc white, iron mica and anticorrosion pigments based on titanium dioxide, and pigment blacks, for example furnace blacks, gas blacks and thermal blacks.

Examples of organic pigments suitable in the context of the present invention are azo pigments, for example monoazo pigments, diazo pigments, polyazo pigments and metal complex pigments; polycyclic pigments, for example copper phthalocyanines, diketopyrrolopyrroles (DPP), quinacridones, isoindolinones, isoindolines, perylenes and perinones; examples of forms of carbon that are suitable in the context of the present invention, insofar as they have not already been listed under the pigments or fillers, are, for example, amorphous carbon, carbon fibres, glassy carbon, graphene, fullerene, diamond, lonsdaleite, activated carbon, carbon nanotubes, carbon nanobuds, carbon nanofoam and aerographite.

The invention is to be elucidated in detail hereinafter by working examples.

Examples

Test Methods:

Parameters or measurements are preferably determined using the methods described herein below. In particular, these methods were used in the examples of the present intellectual property right.

Epoxy Equivalent

The epoxy equivalent is determined in accordance with DIN ISO 16945:

The epoxy equivalent weight is understood to mean that amount of epoxy resin in g containing 16 g of epoxidically bonded oxygen (epoxy oxygen). Epoxy groups in epoxy resins can be determined by addition of HCl onto the epoxide ring. The excess hydrochloric acid is back-titrated with ethanolic potassium hydroxide solution, taking account of a blank value which is run in parallel.

The amount of sample is weighed accurately to 0.1 mg into the Erlenmeyer flasks. Subsequently, a volumetric pipette is used to pipette in 40 ml of a 0.1 mol/l HCl solution in dioxane. The flask is closed with a close-fitting ground glass stopper. The flask is tilted frequently until the sample has dissolved completely. After addition of a few drops of the cresol red indicator solution, the sample is titrated against 0.1 mol/l ethanolic potassium hydroxide solution. On addition of the indicator, the solution turns brick red; shortly before attainment of the endpoint, it turns lemon yellow. The endpoint of the titration has been attained when there is another colour change to blue-violet.

Taking account of the consumption of 0.1 mol/l ethanolic potassium hydroxide solution of blank value and sample and the starting weight, the content of epoxy oxygen is calculated as follows:

$$\%\ \text{Epoxy-}O = \frac{(V_{blank} - V) * c * M}{10 * E}$$

In this Formula:

$V_{blank}$ consumption of 0.1 mol/l ethanolic potassium hydroxide solution in millilitres for the blank titration V consumption of 0.1 mol/l ethanolic potassium hydroxide solution in millilitres for the sample titration C concentration of the ethanolic potassium hydroxide solution used (0.1 mol/l)

M molar mass of oxygen (16 g/mol)

E sample weight in g

1. Preparation of Polyaddition Compounds According to the Invention and Salts Thereof 1.1 Reaction of the Epoxy Resin with the Polyether Alcohol A four-neck flask provided with a stirrer, thermometer, reflux condenser and nitrogen inlet tube is initially charged with the polyether or polyether mixture and heated up to 90° C. while stirring under $N_2$ gas. Potassium methoxide is added to the polyether in a proportion by weight of 1.0%. Subsequently, the epoxy resin is added dropwise within 30 minutes and reaction is continued under $N_2$ gas to 80° C. until the epoxy equivalent is zero. The reaction mixture is neutralized with lactic acid.

A pale yellow-coloured liquid is obtained. The reaction showed a 100% conversion based on the conversion of the epoxy groups.

1.2 a) Preparation of Polyaddition Compounds According to the Invention and Salts Thereof A four-neck flask provided with a stirrer, thermometer, reflux condenser and nitrogen inlet tube is initially charged with the product from 1.1 (1.0 mol) and heated up to 80° C. while stirring under $N_2$ gas. Subsequently, polyphosphoric acid (0.25 mol) is added dropwise within 30 minutes and reaction is continued under $N_2$ gas at 80° for 4 hours.

A pale yellow/orange-coloured liquid was obtained.

1.2 b) Preparation of Polyaddition Compounds According to the Invention and Salts Thereof A four-neck flask provided with a stirrer, thermometer, reflux condenser and nitrogen inlet tube is initially charged with the product from 1.1 (1.0 mol) and heated up to 80° C. while stirring under $N_2$ gas. Subsequently, polyphosphoric acid (0.5 mol) is added dropwise within 30 minutes and reaction is continued under $N_2$ gas at 80° for 4 hours.

A pale yellow/orange-coloured liquid was obtained.

The Formulation can be found in Table 1.

The polyaddition compounds according to the invention and salts thereof were used for production of colour pastes, performance properties of which were examined.

TABLE 1

| | Epoxy resin | Mol | Polyether 1 | Mol | Polyether 2 | Mol | Polyether 3 | Mol | Mol of polyphosphoric acid |
|---|---|---|---|---|---|---|---|---|---|
| 1A | Epon Resin 862 | 1.00 | Tego Alkanol L4 | 0.60 | Polyglycol M 500 | 0.60 | — | — | 0.00 |
| 1B | Epon Resin 862 | 1.00 | Tego Alkanol L4 | 0.60 | Polyglycol M 500 | 0.60 | — | — | 0.25 |
| 1C | Epon Resin 862 | 1.00 | Tego Alkanol L4 | 0.60 | Polyglycol M 500 | 0.60 | — | — | 0.50 |
| 2A | Epon Resin 862 | 1.00 | Imbentin-C-91 040 | 0.96 | Polyglycol M 350 | 0.24 | — | — | 0.00 |
| 2B | Epon Resin 862 | 1.00 | Imbentin-C-91 040 | 0.96 | Polyglycol M 350 | 0.24 | — | — | 0.25 |
| 2C | Epon Resin 862 | 1.00 | Imbentin-C-91 040 | 0.96 | Polyglycol M 350 | 0.24 | — | — | 0.50 |
| 3A | Epon Resin 862 | 1.00 | Imbentin-C-91 040 | 0.72 | Polyglycol M 500 | 0.48 | — | — | 0.00 |
| 3B | Epon Resin 862 | 1.00 | Imbentin-C-91 040 | 0.72 | Polyglycol M 500 | 0.48 | — | — | 0.25 |
| 3C | Epon Resin 862 | 1.00 | Imbentin-C-91 040 | 0.72 | Polyglycol M 500 | 0.48 | — | — | 0.50 |
| 4A | Epon Resin 862 | 1.00 | Imbentin-C-91 040 | 0.84 | Polyglycol M 500 | 0.36 | — | — | 0.00 |
| 4B | Epon Resin 862 | 1.00 | Imbentin-C-91 040 | 0.84 | Polyglycol M 500 | 0.36 | — | — | 0.25 |
| 4C | Epon Resin 862 | 1.00 | Imbentin-C-91 040 | 0.84 | Polyglycol M 500 | 0.36 | — | — | 0.50 |
| 5A | Epon Resin 862 | 1.00 | Tego Alkanol 320 | 0.96 | Polyglycol M 500 | 0.24 | — | — | 0.00 |
| 5B | Epon Resin 862 | 1.00 | Tego Alkanol 320 | 0.96 | Polyglycol M 500 | 0.24 | — | — | 0.25 |
| 5C | Epon Resin 862 | 1.00 | Tego Alkanol S20 | 0.96 | Polyglycol M 500 | 0.24 | — | — | 0.50 |
| 6A | Epon Resin 862 | 1.00 | Imbentin-C-91 040 | 0.60 | Polyglycol M 500 | 0.42 | Polyglykol 600 | 0.18 | 0.00 |
| 6B | Epon Resin 862 | 1.00 | Imbentin-C-91 040 | 0.60 | Polyglycol M 500 | 0.42 | Polyglykol 600 | 0.18 | 0.25 |
| 6C | Epon Resin 862 | 1.00 | Imbentin-C-91 040 | 0.60 | Polyglycol M 500 | 0.42 | Polyglykol 600 | 0.18 | 0.50 |
| 7A | Epon resin 862 | 1.00 | Imbentin-C-91 040 | 0.60 | Polyglycol M 500 | 0.60 | — | — | 0.00 |
| 7B | Epon Resin 862 | 1.00 | Imbentin-C-91 040 | 0.60 | Polyglycol M 500 | 0.60 | — | — | 0.25 |
| 7C | Epon Resin 862 | 1.00 | Imbentin-C-91 040 | 0.60 | Polyglycol M 500 | 0.60 | — | — | 0.50 |
| 8A | Epon Resin 862 | 1.00 | BP 2020 | 1.20 | — | — | — | — | 0.00 |
| 8B | Epon Resin 862 | 1.00 | BP 2020 | 1.20 | — | — | — | — | 0.25 |
| 8C | Epon Resin 862 | 1.00 | BP 2020 | 1.20 | — | — | — | — | 0.50 |
| 9A | DER 331 | 1.00 | BP 1040 | 1.2 | | | — | — | 0.00 |

TABLE 1-continued

| | Epoxy resin | Mol | Polyether 1 | Mol | Polyether 2 | Mol | Polyether 3 | Mol | Mol of polyphosphoric acid |
|---|---|---|---|---|---|---|---|---|---|
| 9B | DER 331 | 1.00 | BP 1040 | 1.2 | | | — | — | 0.25 |
| 9C | DER 331 | 1.00 | BP 1040 | 1.2 | | | — | — | 0.50 |
| 10A | Ipox ER 15 | 1.00 | BP 1040 | 1.2 | | | — | — | 0.00 |
| 10B | Ipox ER 15 | 1.00 | BP 1040 | 1.2 | | | — | — | 0.25 |
| 10C | Ipox ER 15 | 1.00 | BP 1040 | 1.2 | | | — | — | 0.50 |

Materials Used:

TABLE 2

| Product name | Chemical description | Source |
|---|---|---|
| Epon Resin 862 | Resin prepared from bisphenol F and epichlorohydrin | Hexion |
| Tego Alkanol L4 | Fatty alcohol C12-C14 ethoxylate | Evonik Resource Efficiency GmbH |
| Polyglycol M 500 | Methylated polyglycol having a molecular weight of 500 | BASF |
| Polyglycol M 350 | Methylated polyglycol having a molecular weight of 350 | BASF |
| Imbentin-C-91-080 | C9-11 oxo process alcohol with 8 mol of EO | KOLB |
| Imbentin-C-91-040 | C9-11 oxo process alcohol with 4 mol of EO | KOLB |
| Tego Alkanol S20 | Fatty alcohol C18 ethoxylate | Evonik Resource Efficiency GmbH |
| Polyglykol 600 | Polyglycol having a molecular weight of 600 | BASF |
| Polyglycol B 2020 | Butylated polyglycol having a molecular weight of 2000 with 20% propylene oxide and 80% ethylene oxide | Evonik Resource Efficiency GmbH |
| DER 331 | Resin prepared from bisphenol A and epichlorohydrin | Dow |
| Polyglycol B 1040 | Butylated polyglycol having a molecular weight of 2000 with 40% propylene oxide and 60% ethylene oxide | Evonik Resource Efficiency GmbH |
| Ipox ER15 | Resin prepared from bisphenol A and epichlorohydrin, hydrogenated | Ipox Chemicals |

2. Method for Performance Tests

Rub-Out Test:

For the “rub-out test”, the colour pastes were applied to a plate with a Leneta 150 μm drawdown bar. After drying time of 5 minutes, the ‘rub-out test’ was done, which consists in rubbing the applied varnish. The colour values are determined correspondingly before and after the rubbing and the ΔE (delta E) or colour differences are calculated, which is used as a measure for the distance between two colours and correspondingly enables a conclusion with regard to the pigment stabilization in the performance of the “rub-out test”. In the reporting of colour differences, the value of 1 or less than 1 denotes a difference which is not perceived by the human eye.

Colour Strength

The colorimetric values were determined with an X-Rite Model SP 62 spectrometer. The colour strength F was determined using the following measurement:

$$F = \frac{(100 - Y)^2}{2Y}$$

Y=the reflection capacity of the wavelength at absorption maximum

The colour strength gives a statement with regard to the colour intensity, which can vary according to the pigment, but also according to the dispersant and milling process. The higher the colour strength, the better the dispersant.

Sediment

After storage at room temperature for 24 h, colour pastes are assessed visually as to whether there is a sedimentation or not.

Yield Point

The yield point was determined according to DIN 1342-1 2003 11 and DIN Fachbericht No. 143, and the tangent intersection method was used to determine yield point values.

3. Performance Evaluation 3.1 Colour Pastes for Aqueous and Solventborne Systems For the performance assessment, colour pastes according to the Formulations from the respective Tables 4-6 were first produced. The comparative examples (VG) were produced with commercial dispersants.

For performance testing, respective colour pastes were converted to aqueous or solventborne systems.

The yield point and sedimentation are determined directly from the colour paste.

3.1.1 Production of the Aqueous Test System:

0.73 g of the colour paste (VG1 and 1B yellow) and 19.27 g of a polyurethane-based paint of the ContiPur Satin brand from Kluthe were weighed out in a 50 ml cosmetics pot and homogenized with the aid of a Speed Mixer DAC 150 FVZ (from Hauschild) at 2000 rpm for 1 min.

3.1.2 Production of the Solventborne Test System:

0.73 g of the colour paste (VG1 and 1B yellow) and 19.27 g of a gloss paint of the Impredur Hochglanzlack 840 brand, aromatics-free and alkyd resin-based, from Brillux were weighed out in a 50 ml cosmetics pot and homogenized with the aid of a Speed Mixer DAC 150 FVZ (from Hauschild) at 2000 rpm for 1 min.

TABLE 3

| Materials used | |
|---|---|
| Product | Source |
| TEGO ® Dispers 653 | Evonik Resource Efficiency GmbH |
| TEGO ® Dispers 652 | Evonik Resource Efficiency GmbH |
| TEGO ® Foamex 810 | Evonik Resource Efficiency GmbH |
| TEGO ® Foamex 830 | Evonik Resource Efficiency GmbH |
| TEGO ® Foamex 8050 | Evonik Resource Efficiency GmbH |
| PARMETOL ® K 40 | Schülke & Mayr GmbH |
| BAYFERROX ® 915 | LANXESS GmbH |
| HOSTAPERM ® Rosa E | Clariant International Ltd |
| COLOR BLACK FW 200 | Orion Engineered Carbons GmbH |

TABLE 4

| Bayferrox 915 pigment | | | |
|---|---|---|---|
| | Colour paste Formulation | | |
| | Solids content (SC) [%] | VG1 (g) | 1B yellow (g) |
| Demin. water | | 26.2 | 23.6 |
| TEGO ® Dispers 653 | 35 | 15.7 | — |
| 1B | 30 | — | 18.3 |
| TEGO ® Dispers 652 | 100 | 2.0 | 2.0 |
| TEGO ® Foamex 810 | | 1.0 | 1.0 |
| PARMETOL ® K 40 | | 0.1 | 0.1 |
| BAYFERROX ® 915 | | 55.0 | 55.0 |
| Total | | 100.0 | 100.0 |
| Additive solids on pigment [%] | | 10 | 10 |
| Application test results: Aqueous-based test system | | | |
| F | | 7.83 | 8.08 |
| delta E | | 0.48 | 0.62 |
| delta *a | | −0.03 | −0.07 |
| delta *b | | −0.39 | −0.59 |
| Solventborne test system | | | |
| F | | 5.58 | 5.05 |
| delta E | | 0.16 | 0.86 |
| delta *a | | 0.10 | −0.14 |
| delta *b | | −0.12 | 0.79 |
| Rheology | | | |
| Yield point (τ in PA) | | ~0.3 | ~12.6 |
| Sedimentation | | yes | no |

It was possible to observe a yield point in VG1, but settling of the pigments is observed. The inventive colour paste 1B yellow has nearly the same colour values as VG1, but no settling of the pigments is observed.

“Additive solids on pigment” is a parameter known to those skilled in the art; “additive” here means TEGO® Dispers 653 or polyaddition compounds according to the invention and salts thereof.

TABLE 5

| Hostaperm Rosa E pigment | | | |
|---|---|---|---|
| | Colour paste Formulation | | |
| | SC [%] | VG2 (g) | 1B pink (g) |
| Demin. water | | 59.6 | 57.3 |
| TEGO ® Dispers 653 | 35 | 14.3 | — |
| 1B | 30 | — | 16.6 |
| TEGO ® Foamex 8050 | | 1.0 | 1.0 |
| PARMETOL ® K 40 | | 0.1 | 0.1 |
| HOSTAPERM ® Rosa E | | 25.0 | 25.0 |
| Total | | 100.0 | 100.0 |
| Additive solids on pigment [%] | | 20 | 20 |
| Application test results: Aqueous-based test system | | | |
| F | | 34.64 | 34.07 |
| delta E | | 0.79 | 0.48 |
| delta *a | | −0.62 | 0.11 |
| delta *b | | −0.05 | −0.25 |
| Solventborne test system | | | |
| F | | 15.78 | 14.80 |
| delta E | | 12.44 | 12.42 |
| delta *a | | 10.12 | 10.75 |
| delta *b | | −5.47 | −5.22 |
| Rheology | | | |
| Yield point (τ in PA) | | none | ~38 |
| Sedimentation | | yes | no |

3.1.3 Production of the Aqueous Test System:

0.64 g of the colour paste (VG2 and 1B pink) and 19.36 g of a polyurethane-based paint of the ContiPur Satin brand from Kluthe were weighed out in a 50 ml cosmetics pot and homogenized with the aid of a Speed Mixer DAC 150 FVZ (from Hauschild) at 2000 rpm for 1 min.

3.1.4 Production of the Solventborne Test System:

0.64 g of the colour paste (VG1 and 1B pink) and 19.36 g of a gloss paint of the Impredur Hochglanzlack 840 brand, aromatics-free and alkyd resin-based, from Brillux were weighed out in a 50 ml cosmetics pot and homogenized with the aid of a Speed Mixer DAC 150 FVZ (from Hauschild) at 2000 rpm for 1 min.

TABLE 6

| Colour Black FW 200 pigment | | | |
|---|---|---|---|
| | Colour Black FW 200 | | |
| | SC [%] | VG3 (g) | 1B black (g) |
| Demin. water | | 38.9 | 32.2 |
| TEGO ® Dispers 653 | 35 | 40.0 | — |
| 1B | 30 | — | 46.7 |
| TEGO ® Foamex 830 | | 1.0 | 1.0 |
| PARMETOL ® K 40 | | 0.1 | 0.1 |
| COLOUR BLACK FW 200 | | 20.0 | 20.0 |
| Total | | 100.0 | 100.0 |
| Additive solids on pigment [%] | | 70 | 70 |
| Application test results: Aqueous-based test system | | | |
| F | | 111.70 | 109.20 |
| delta E | | 0.52 | 0.66 |
| delta *a | | −0.03 | 0.04 |
| delta *b | | −0.20 | 0.13 |
| Solventborne test system | | | |
| F | | 77.34 | 73.71 |
| delta E | | 0.68 | 0.91 |
| delta *a | | 0.04 | 0.54 |
| delta *b | | 0.04 | 0.34 |
| Rheology | | | |
| Yield point (τ in PA) | | none | ~168 |
| Sediment | | yes | no |

3.1.5 Production of the Aqueous Test System:

0.80 g of the colour paste (VG2 and 1B pink) and 19.2 g of a polyurethane-based paint of the ContiPur Satin brand from Kluthe were weighed out in a 50 ml cosmetics pot and homogenized with the aid of a Speed Mixer DAC 150 FVZ (from Hauschild) at 2000 rpm for 1 min.

3.1.6 Production of the Solventborne Test System:

0.80 g of the colour paste (VG1 and 1B pink) and 19.2 g of a gloss paint of the Impredur Hochglanzlack 840 brand, aromatics-free and alkyd resin-based, from Brillux were weighed out in a 50 ml cosmetics pot and homogenized with the aid of a Speed Mixer DAC 150 FVZ (from Hauschild) at 2000 rpm for 1 min.

It is observed that VG2 and VG3 do not have a yield point and additionally sediment. The colour pastes according to the invention with the respective pigments have good colour values and do not sediment. It was possible to determine a yield point.

3.2 Colour Pastes for Solventborne Systems

For the performance assessment, colour pastes according to the Formulations from the respective Tables 8-9 were first produced. The comparative examples (VG) were produced with commercial dispersants.

For performance testing, the respective colour pastes were converted to solventborne systems.

3.2.1 Production of the Solventborne Test System for BAYFERROX® 915 Pigment:

0.73 g of the colour paste containing the BAYFERROX® 915 pigment and 19.27 g of a gloss paint of the Impredur Hochglanzlack 840 brand, aromatics-free and alkyd resin-based, from Brillux were weighed out in a 50 ml cosmetics pot and homogenized with the aid of a Speed Mixer DAC 150 FVZ (from Hauschild) at 2000 rpm for 1 min.

3.2.2 Production of the Solventborne Test System for BAYFERROX® 140M Pigment:

0.62 g of the colour paste containing the BAYFERROX® 915 pigment and 19.38 g of a gloss paint of the Impredur Hochglanzlack 840 brand, aromatics-free and alkyd resin-based, from Brillux were weighed out in a 50 ml cosmetics pot and homogenized with the aid of a Speed Mixer DAC 150 FVZ (from Hauschild) at 2000 rpm for 1 min.

TABLE 7

| Materials used: | |
|---|---|
| Product | Source |
| TEGO ® VariPlus LK | Evonik Resource Efficiency GmbH |
| TEGO ® Dispers 676 | Evonik Resource Efficiency GmbH |
| BAYFERROX ® 140 M | LANXESS GmbH |
| BAYFERROX ® 915 | LANXESS GmbH |

TABLE 8

| BAYFERROX ® 140M pigment | | | | |
|---|---|---|---|---|
| | | Colour paste | | |
| | SC [%] | VG4 (g) | 5B red (g) | 5C red (g) |
| TEGO ® VariPlus LK | | 12.3 | 12.3 | 12.3 |
| TEGO ® Dispers 676 | 85 | 4.6 | — | — |
| 5B | 100 | — | 3.9 | — |
| 5C | 100 | — | — | 3.9 |
| Methoxypropyl acetate | | 18.2 | 18.9 | 18.9 |
| BAYFERROX ® 140M | | 65.0 | 65.0 | 65.0 |
| Total | | 100.0 | 100.0 | 100.0 |
| Additive solids on pigment [%] | | 6 | 6 | 6 |
| Resin solids on pigment [%] | | 17.5 | 17.5 | 17.5 |
| Performance test results: | | | | |
| F | | 34.61 | 35.41 | 34.70 |
| delta E | | 0.24 | 0.13 | 0.13 |
| delta *a | | 0.02 | −0.10 | −0.10 |
| delta *b | | 0.24 | 0.08 | 0.03 |
| Rheology | | | | |
| Yield point (τ in PA) | | none | ~20.9 | ~10.2 |
| Sedimentation | | yes | no | no |

TABLE 9

| Bayferrox 915 pigment | | | | |
|---|---|---|---|---|
| | | Colour paste | | |
| | SC [%] | VG5 (g) | 5B yellow (g) | 5C yellow (g) |
| TEGO ® VariPlus LK | | 11.9 | 11.9 | 11.9 |
| TEGO ® Dispers 676 | 85 | 4.6 | — | — |
| 5B | 100 | — | 3.9 | — |
| 5C | 100 | — | — | 3.9 |
| Methoxypropyl acetate | | 28.6 | 29.3 | 29.3 |
| BAYFERROX ® 915 | | 55.0 | 55.0 | 55.0 |
| Total | | 100.0 | 100.0 | 100.0 |
| Additive solids on pigment [%] | | 7 | 7 | 7 |
| 100% Resin on pigment [%] | | 20 | 20 | 20 |
| Performance test results: | | | | |
| F | | 6.75 | 6.07 | 6.65 |
| delta E | | 0.59 | 0.33 | 0.58 |
| delta *a | | 0.39 | 0.17 | 0.34 |
| delta *b | | 0.43 | 0.17 | 0.17 |
| Rheology | | | | |
| Yield point (τ in PA) | | none | ~10.2 | ~15.6 |
| Sedimentation | | yes | no | no |

In the case of these colour pastes too, it was observed that the inventive colour pastes 5B red, 5B yellow and 5C red, 5C yellow have good colour values with yield points and no sedimentation.

3.3 Colour Pastes for Aqueous Systems

For the determination of yield point and sediment, colour pastes according to the Formulations from the respective Tables 11-16 were produced. The comparative examples (VG) were produced with commercial dispersants.

TABLE 10

| Materials used | |
|---|---|
| Product | Source |
| TEGO ® Dispers 653 | Evonik Resource Efficiency GmbH |
| TEGO ® Foamex 810 | Evonik Resource Efficiency GmbH |
| PARMETOL ® K 40 | Schülke & Mayr GmbH |
| BAYFERROX ® 318 M | LANXESS GmbH |
| BAYFERROX ® 140 M | LANXESS GmbH |
| BAYFERROX ® 3920 | LANXESS GmbH |
| KRONOS ® 2190 | KRONOS TITAN GmbH |
| KRONOS ® 2310 | KRONOS TITAN GmbH |
| Tronox 902+ | Tronox Pigments BV |
| SICOPAL ® L 1110 | BASF SE |

TABLE 11

| BAYFERROX ® 318 M pigment | | | | |
|---|---|---|---|---|
| | Colour paste | | | |
| | VG6 (g) | 2B black (g) | 4C black (g) | 3C black (g) |
| Demin. water | 20.9 | 18.7 | 18.7 | 18.7 |
| TEGO ® Dispers 653 | 13 | 0 | 0 | 0 |

TABLE 11-continued

| BAYFERROX ® 318 M pigment | | | | |
|---|---|---|---|---|
| | Colour paste | | | |
| | VG6 (g) | 2B black (g) | 4C black (g) | 3C black (g) |
| 2B | 0 | 15.2 | 0 | 0 |
| 4C | 0 | 0 | 15.2 | 0 |
| 3C | 0 | 0 | 0 | 15.2 |
| TEGO ® Foamex 810 | 1 | 1 | 1 | 1 |
| BAYFERROX ® 318 M | 65 | 65 | 65 | 65 |
| PARMETOL ® K 40 | 0.1 | 0.1 | 0.1 | 0.1 |
| Total | 100.0 | 100.0 | 100.0 | 100.0 |
| Additive solids on pigment | 7.0 | 7.0 | 7.0 | 7.0 |
| Rheology | | | | |
| Yield point (τ in PA) | ~0.5 | ~30 | ~32 | ~5 |
| Sedimentation | yes | no | no | no |

TABLE 12

| BAYFERROX ® 140 M pigment | | | | |
|---|---|---|---|---|
| | Colour paste | | | |
| | VG7 (g) | 2B red (g) | 4C red (g) | 3C red (g) |
| Demin. water | 21.8 | 18.9 | 18.9 | 18.9 |
| TEGO ® Dispers 653 | 17.1 | 0 | 0 | 0 |
| 2B | 0 | 20 | 0 | 0 |
| 4C | 0 | 0 | 20 | 0 |
| 3 C | 0 | 0 | 0 | 20 |
| TEGO ® Foamex 810 | 1 | 1 | 1 | 1 |
| BAYFERROX ® 140 M | 60 | 60 | 60 | 60 |
| PARMETOL ® K 40 | 0.1 | 0.1 | 0.1 | 0.1 |
| Total | 100.0 | 100.0 | 100.0 | 100.0 |
| Additive solids on pigment | 10.0 | 10.0 | 10.0 | 10.0 |
| Rheology | | | | |
| Yield point (τ in PA) | ~2 | ~10.1 | ~10.1 | ~10.2 |
| Sediment | yes | no | no | no |

TABLE 12

| BAYFERROX ® 3920 pigment | | | | |
|---|---|---|---|---|
| | Colour paste | | | |
| | VG8 (g) | 2B orange (g) | 4C orange (g) | 3C orange (g) |
| Demin. water | 28.2 | 25.6 | 25.6 | 25.6 |
| TEGO ® Dispers 653 | 15.7 | 0 | 0 | 0 |
| 2B | 0 | 18.3 | 0 | 0 |
| 4C | 0 | 0 | 18.3 | 0 |
| 3C | 0 | 0 | 0 | 18.3 |
| TEGO ® Foamex 810 | 1 | 1 | 1 | 1 |

TABLE 12-continued

| BAYFERROX ® 3920 pigment | | | | |
|---|---|---|---|---|
| | Colour paste | | | |
| | VG8 (g) | 2B orange (g) | 4C orange (g) | 3C orange (g) |
| BAYFERROX ® 3920 | 55 | 55 | 55 | 55 |
| PARMETOL ® K 40 | 0.1 | 0.1 | 0.1 | 0.1 |
| Total | 100.0 | 100.0 | 100.0 | 100.0 |
| Additive solids on pigment | 10.0 | 10.0 | 10.0 | 10.0 |
| Rheology | | | | |
| Yield point (τ in PA) | ~0.3 | 10.4 | ~13.7 | ~15.6 |
| Sedimentation | yes | no | no | no |

TABLE 13

| KRONOS ® 2190 pigment | | | | |
|---|---|---|---|---|
| | Colour paste | | | |
| | VG9 (g) | 2B Kronos 2190 (g) | 4C Kronos 2190 (g) | 3C Kronos 2190 (g) |
| Demin. water | 12.9 | 10.2 | 10.2 | 10.2 |
| TEGO ® Dispers 653 | 16 | 0 | 0 | 0 |
| 2B | 0 | 18.7 | 0 | 0 |
| 4C | 0 | 0 | 18.7 | 0 |
| 3C | 0 | 0 | 0 | 18.7 |
| TEGO ® Foamex 810 | 1 | 1 | 1 | 1 |
| KRONOS ® 2190 | 70 | 70 | 70 | 70 |
| PARMETOL ® K 40 | 0.1 | 0.1 | 0.1 | 0.1 |
| Total | 100.0 | 100.0 | 100.0 | 100.0 |
| Additive solids on pigment | 8.0 | 8.0 | 8.0 | 8.0 |
| Rheology | | | | |
| Yield point (τ in PA) | ~2 | ~12 | ~11 | ~10 |
| Sediment | yes | no | no | no |

TABLE 14

| KRONOS ®2310 pigment | | | | |
|---|---|---|---|---|
| | Colour paste | | | |
| | VG10 (g) | 2B Kronos2310 (g) | 4C Kronos2310 (g) | 3C Kronos2310 (g) |
| Demin. water | 12.9 | 10.2 | 10.2 | 10.2 |
| TEGO ® Dispers 653 | 16 | 0 | 0 | 0 |
| 2B | 0 | 18.7 | 0 | 0 |
| 4C | 0 | 0 | 18.7 | 0 |
| 3C | 0 | 0 | 0 | 18.7 |
| TEGO ® Foamex 810 | 1 | 1 | 1 | 1 |
| KRONOS ® 2310 | 70 | 70 | 70 | 70 |
| PARMETOL ® K 40 | 0.1 | 0.1 | 0.1 | 0.1 |
| Total | 100.0 | 100.0 | 100.0 | 100.0 |
| Additive solids on pigment | 7.0 | 7.0 | 7.0 | 7.0 |

TABLE 14-continued

| KRONOS ®2310 pigment | | | | |
|---|---|---|---|---|
| | Colour paste | | | |
| | VG10 (g) | 2B Kronos2310 (g) | 4C Kronos2310 (g) | 3C Kronos2310 (g) |
| Rheology | | | | |
| Yield point (τ in PA) | ~2 | ~10.2 | ~10.3 | ~10.3 |
| Sedimentation | yes | no | no | no |

TABLE 15

| Tronox 902 pigment | | | | |
|---|---|---|---|---|
| | Colour paste | | | |
| | VG11 (g) | 2B Tronox 902 (g) | 4C Tronox 902 (g) | 3C Tronox 902 (g) |
| Demin. water | 12.9 | 10.2 | 10.2 | 10.2 |
| TEGO ® Dispers 653 | 16 | 0 | 0 | 0 |
| 2B | 0 | 18.7 | 0 | 0 |
| 4C | 0 | 0 | 18.7 | 0 |
| 3C | 0 | 0 | 0 | 18.7 |
| TEGO ® Foamex 810 | 1 | 1 | 1 | 1 |
| Tronox 902+ | 70 | 70 | 70 | 70 |
| PARMETOL ® K 40 | 0.1 | 0.1 | 0.1 | 0.1 |
| Total | 100.0 | 100.0 | 100.0 | 100.0 |
| Additive solids on pigment | 7.0 | 7.0 | 7.0 | 7.0 |
| Rheology | | | | |
| Yield point (τ in PA) | ~2 | ~14 | ~10.3 | ~10.3 |
| Sediment | yes | no | no | no |

TABLE 16

| SICOPAL ® L 1110 pigment | | | | |
|---|---|---|---|---|
| | Colour paste | | | |
| | VG12 (g) | 2B yellow (g) | 4C yellow (g) | 3C yellow (g) |
| Demin. water | 20.9 | 18.9 | 18.9 | 18.9 |
| TEGO ® Dispers 653 | 18 | 0 | 0 | 0 |
| 2B | 0 | 20 | 0 | 0 |
| 4C | 0 | 0 | 20 | 0 |
| 3C | 0 | 0 | 0 | 20 |
| TEGO ® Foamex 810 | 1 | 1 | 1 | 1 |
| SICOPAL ® L 1110 | 60 | 60 | 60 | 60 |
| PARMETOL ® K 40 | 0.1 | 0.1 | 0.1 | 0.1 |
| Total | 100.0 | 100.0 | 100.0 | 100.0 |
| Additive solids on pigment | 10.0 | 10.0 | 10.0 | 10.0 |
| Rheology | | | | |
| Yield point (τ in PA) | ~2 | ~15.0 | ~20.0 | ~182.8 |
| Sedimentation | yes | no | no | no |

It has been shown that the polyaddition compounds according to the invention and salts thereof are suitable for the production of colour pastes with various pigments, where the colour pastes do not show any settling of the pigments and additionally have a yield point.

3.4 Anti-Floating Effect

To assess the anti-floating effect, a colour paste and a white paste were first produced. Thereafter, the two pastes are added to a tinting Formulation and analysed.

The Formulation of the pastes can be found in Tables 18-20.

TABLE 17

| Materials used | |
|---|---|
| Product | Source |
| TEGO ® Dispers 653 | Evonik Resource Efficiency GmbH |
| TEGO ® Foamex 810 | Evonik Resource Efficiency GmbH |
| PARMETOL ® K 40 | Schülke & Mayr GmbH |
| HOSTAPERM ® Rosa E | Lanxess GmbH |
| KRONOS ® 2310 | KRONOS TITAN GmbH |
| NeoCryl ® XK-92 | DSM |
| Texanol | EASTMAN |

TABLE 18

| Formulation of colour paste 11 with HOSTAPERM ® Rosa E pigment | | | |
|---|---|---|---|
| | Colour paste 11 | | |
| | SC [%] | VG2 (g) | 1B-pink Anti (g) |
| Water | | 59.6 | 57.2 |
| TEGO ® Dispers 653 | 35 | 14.3 | — |
| 1B | 30 | — | 16.7 |
| TEGO ® Foamex 810 | | 1.0 | 1.0 |
| Parmetol K 40 | | 0.1 | 0.1 |
| Hostaperm Rosa E | | 25.0 | 25.0 |
| Total | | 100.0 | 100.0 |
| Additive solids on pigment [%] | | 20 | 20 |

TABLE 19

| Formulation of white paste 11 | | | |
|---|---|---|---|
| | White paste 11 | | |
| | SC [%] | VG13 (g) | 1B white Anti (g) |
| Water | | 34.4 | 37.5 |
| TEGO ® Dispers 653 | 35 | 5.1 | — |
| 1B | 30 | — | 2.0 |
| TEGO ® Foamex 810 | | 0.5 | 0.5 |
| KRONOS ®2310 | | 60.0 | 60.0 |
| Total | | 100.0 | 100.0 |
| Additive solids on pigment | | 3* | 1* |

*optimal additive content

TABLE 20

| Formulation of the tinting | |
|---|---|
| Raw materials | Amount (g) |
| NeoCryl ® XK-92 | 97 |
| Texanol | 3 |

3.4.1 Colour Value and Rub-Out

For the performance testing, 10 g of the tinting were homogenized with 5 g of white paste 11 with the aid of a Speed Mixer DAC 150 FVZ (from Hauschild) at 2000 rpm for 1 min. Subsequently, 1 g of colour paste 11 is weighed in and homogenized with the aid of the Speed Mixer DAC 150 FVZ (from Hauschild) at 2000 rpm for 1 min, referred to as Z Anti.

For the comparative example VGAnti, VG13 and VG2 were used analogously. This composition Z Anti and comparative example VGAnti were applied correspondingly for the rub-out test and for the measurement of colour strength.

TABLE 21

| Results of the anti-floating effect | | | | | | | | | | |
|---|---|---|---|---|---|---|---|---|---|---|
| | | *L | *a | *b | Y | F | ΔL | Δa | Δb | ΔE |
| VGAnti | Before rub-out | 50.96 | 58.5 | −6.04 | 19.23 | 169.57 | 12.46 | −5.94 | −10.74 | 17.49 |
| | After rub-out | 63.42 | 52.56 | −16.78 | 32.09 | 71.84 | | | | |
| ZAnti | Before rub-out | 65.44 | 51.37 | −18.16 | 34.61 | 61.79 | 0.52 | −0.43 | −0.22 | 0.71 |
| | After rub-out | 65.96 | 50.94 | −18.38 | 35.27 | 59.39 | | | | |

The inventive composition ZAnti has a very low delta E compared to the comparative example VGAnti, which indicates good pigment stabilization and simultaneously an anti-floating effect.
F is the colour strength. A significant change in colour strength is apparent in the case of the comparative example VGAnti, whereas there is barely any change in the colour strength in the case of the inventive composition ZAnti.

3.5 Performance Testing with $TiO_2$ (White Pigment)

For performance assessment, slurries were first produced:

The slurries, a thin mixture of water and very finely divided titanium dioxide (white pigment), are produced according to the test Formulation in Table 22. For this purpose, water, additive, preservative and white pigment are first blended in the ratios and sequence which follow.

TABLE 22

| Test Formulation: | |
|---|---|
| Component | Weight |
| Water | 19.9 g |
| Additives (0.35% additive solid on pigment) | 0.7 g |
| Preservative (Parmetol K40 from Schülke) | 0.1 g |
| White pigment (Kronos 2190 from Kronos) | 75.0 g |

Subsequently, 75.0 g of the mixture prepared and 75.0 g glass beads are weighed out in a 150 ml cosmetics pot and dispersed with the aid of the SpeedMixer DAC 150 FVZ (from Hauschild) at 1300 rpm for 5 min. After the dispersion operation, the slurry thus produced is separated from the glass beads by simple filtration.

After storage at 50° C. for 2 weeks, the slurries are visually assessed as to whether there is a sediment or not. If a sediment has formed, for the quantification of the sediment, the supernatant medium is cautiously removed with a pipette. Thus, the slurry was decanted off from the sediment. The remaining amount of sediment was determined gravimetrically. The percentage of the amount of sediment is calculated from the amount of slurry weighed divided by the amount of sediment after decantation.

Amount of sediment (%)=amount of slurry (g)/amount of sediment after decantation (g)

Table 23, the corresponding table below, has the corresponding percentages of sediment for the inventive substances produced by comparison with commercially available additives. It is clearly apparent and can be inferred from this that the inventive substances produced are superior to the commercially available additives. Barely any sediment has formed in the case of the slurries comprising the compounds according to the invention.

TABLE 23

| Sediment in percent | | |
|---|---|---|
| | Additive assessed | Amount of sediment (in %) |
| Comparative additive 1 | TEGO Dispers 715 W from Evonik | 40 |
| Comparative additive 2 | TEGO Dispers 715 W from Evonik | 40 |
| Comparative additive 3 | Pidicryl 6400 A from Pidilite | 40 |
| Comparative additive 4 | Pidicryl 6300 J from Pidilite | 40 |
| Comparative additive 5 | Orotan 1124 from Dow | 38 |
| Inventive | 9 B | <5 |
| Inventive | 9 C | <5 |
| Inventive | 10 C | <5 |

The invention claimed is:

1. A polyaddition compound and/or a salt thereof, obtainable by the reaction of an epoxy resin based on at least one diglycidyl ether of Formula (I)

Formula (I)

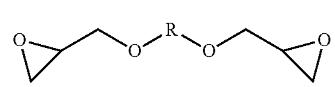

wherein R=a divalent aliphatic or monocyclic aromatic or bicyclic aromatic radical or mixtures thereof, with at least one polyether alcohol of Formula (II)

$$R^1\text{-}[OEt]_n\text{-}[OPr]_m\text{-}[OBu]_s\text{-}[OSO]_r\text{-}OH \quad \text{Formula (II)}$$

wherein

R1=independently identical or different, linear or branched, optionally aromatic hydrocarbyl radicals having 1 to 18 carbon atoms,

[OEt]=ethylene oxide radical,
[OPr]=propylene oxide radical,
[OBu]=butylene oxide radical,
[OSO]=styrene oxide radical,
n=0 to 100,
m=0 to 50,
s=0 to 20, and
r=0 to 3,
with the proviso that n+m+s+r=3-103,
and
with at least one compound containing at least one functional group selected from the group consisting of sulfate groups, sulfonate groups, carboxylate groups and phosphate groups.

2. The polyaddition compound according to claim 1, wherein the diglycidyl ether of the Formula (I) is selected from diglycidyl ethers of difunctional saturated or unsaturated, branched or unbranched, cyclic or open-chain C2-C30 alcohols, diglycidyl ethers of difunctional polyether polyols of low to high molecular weight, or from diglycidyl ethers of difunctional unsubstituted or substituted, monocyclic, polycyclic and/or fused diphenols or triphenols selected from 1,4-dihydroxybenzene, 1,3-dihydroxybenzene, 1,2-dihydroxybenzene, 1,3-dihydroxytoiuene, 3,5-dihydroxybenzoate, 2,2-bis(4-hydroxyphenyl)propane (bisphenol A), bis(4-hydroxyphenyi)methane (bisphenol F), bis(4-hydroxyphenyl) sulfone (bisphenol S), naphthoresorcinol, dihydroxynaphthalene, dihydroxyanthraquinone, dihydroxybiphenyl, 3,3-bis(p-hydroxyphenyl)phthalide, 5,5-bis(4-bydroxyphenyl)hexahydro-4,7-methanoindane, phenolphthalein, fluorescein, 4,4'-[bis(hydroxyphenyl)-1,3-phenylenebis(1-methylethylidene)] (bisphenol M), 4,4'-[bis(hydroxyphenyl)-1,4-phenylenebis(1-methylethylidene)] (bisphenol P), or 2,2'-diallyl bisphenol A.

3. The polyaddition compound according to claim 1, wherein the reaction is conducted in the presence of a reaction catalyst.

4. The polyaddition compound according to claim 3, wherein the reaction catalyst is selected from sodium hydroxide, potassium hydroxide, lithium hydroxide, barium hydroxide, strontium hydroxide, alkali metal alkoxides, the alkali metal salts of carboxylic acids, inorganic protic acids, organic protic acids, Lewis acids and complexes thereof, aliphatic, cycloaliphatic, araliphatic amines, nitrogen heterocycles, tertiary amines, quaternary ammonium salts or mixtures thereof.

5. The polyaddition compound according to claim 1, wherein the compound containing a functional group is selected from sulfuric acid, chlorosulfonic acid and sulfur trioxide for formation of sulfate groups, polyphosphoric acid, phosphoric acid, phosphorus pentoxide and phosphorus pentachloride for formation of phosphate groups, acid anhydride and chloroacetic acid for formation of carboxylate groups, propane sulfone, butane sultone and 3-chloro-2-hydroxypropanesulfonic acid for formation of sulfonate groups, and/or salts thereof.

6. A process for preparing a polyaddition compound and/or a salt thereof, the process comprising:
reacting an epoxy resin based on at least one diglycidyl ether of Formula (I)

Formula (I)

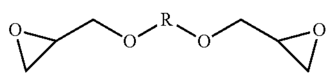

wherein R=a divalent aliphatic or monocyclic aromatic or bicyclic aromatic radical or mixtures thereof
with at least one polyether alcohol of Formula (II)

$R^1$-$[OEt]_n$-$[OPr]_m$-$[OBu]_s$-$[OSO]_r$-OH     Formula (II)

wherein
$R^1$=independently identical or different, linear or branched, optionally aromatic hydrocarbyl radicals having 1 to 18 carbon atoms,
[OEt]=ethylene oxide radical,
[OPr]=propylene oxide radical,
[OBu]=butylene oxide radical,
[OSO]=styrene oxide radical, n=0 to 100, m=0 to 50, s=0 to 20, and r=0 to 3,
with the proviso that n+m+s+r=3-103, at a temperature between 25° C. and 300° C.,
then reacting with at least one compound containing at least one functional group selected from the group consisting of sulfate groups, sulfonate groups, carboxylate groups and phosphate groups.

7. The process according to claim 6, wherein the molar ratio of the epoxy groups of diglycidyl ether of Formula (I) to the OH groups of the polyether alcohol of Formula (II) is 10:0.5 to 10:4.0.

8. The process according to claim 6, wherein the compound containing a functional group is selected from sulfuric acid, chlorosulfonic acid and sulfur trioxide for formation of sulfate groups, polyphosphoric acid, phosphoric acid, phosphorus pentoxide and phosphorus pentachloride for formation of phosphate groups, acid anhydride and chloroacetic acid for formation of carboxylate groups, propane sultone, butane sultone and 3-chloro-2-hydroxypropanesulfonic acid for formation of sulfonate groups, and/or salts thereof.

9. The process according to claim 8, wherein the hydroxyl groups in the polyether alcohols of Formula (II) are partially or fully converted to phosphate groups, sulfate groups, sulfonate groups or carboxylate groups.

10. The process according to claim 6, wherein the reaction is conducted in the presence of a reaction catalyst.

11. The process according to claim 6, wherein the reaction catalyst is at least one selected from the group consisting of sodium hydroxide, potassium hydroxide, lithium hydroxide, barium hydroxide, strontium hydroxide, alkali metal alkoxides, alkali metal salts of carboxylic acids, inorganic and organic protic acids, Lewis acids and complexes thereof, aliphatic, cycloaliphatic, araliphatic amines, nitrogen heterocycles, tertiary amines, and quaternary ammonium salts.

12. The process according to claim 6, wherein the diglycidyl ether of the Formula (I) is selected from the group consisting of diglycidyl ethers of difunctional saturated or unsaturated, branched or unbranched, cyclic or open-chain C2-C30 alcohols, selected from ethylene glycol, butanediol, hexanediol, octanediol glycidyl ethers, cyclohexanedimethanol diglycidyl ethers and neopentyl glycol diglycidyl ethers, from diglycidyl ethers of difunctional polyether polyols of low to high molecular weight, selected from polyethylene glycol diglycidyl ethers or polypropylene glycol diglycidyl ethers, or from diglycidyl ethers of difunctional unsubstituted or substituted, monocyclic, polycyclic and/or fused diphenols or triphenols selected from 1,4-dihydroxybenzene, 1,3-dibydroxybenzene, 1,2-dihydroxybenzene, 1,3-dihydroxytoiuene, 3,5-dihydroxybenzoate, 2,2-bis(4-hydroxyphenyl)propane (bisphenol A), bis(4-hydroxyphenyl)methane (bisphenol F), bis(4-hydroxyphenyl) sulfone (bisphenol S), naphthoresorcinol, dihydroxynaphthalene, dihydroxyanthraquinone, dihydroxybiphenyl, 3,3- bis(p-hydroxyphenyl)phthalide, 5,5-bis(4-hydroxyphenyl) hexahydro-4,7-methanoindane, phenolphthalein, fluorescein, 4,4'-[bis(hydroxyphenyl)-1,3-phenylenebis(1-methylethylidene)] (bisphenol M), 4,4'-[bis(hydroxyphenyl)-1,4-phenylenebis(1-methylethylidene)] (bisphenol P), and 2,2'-diailyl bisphenol A.

13. A composition, comprising: at least one particulate solid, and a polyaddition compound and/or salt thereof according to claim 1.

14. The composition according to claim 13, which, when in the form of an aqueous and/or solvent-borne system, has a yield point.

15. The composition according to claim 14, which has a yield point, determined according to DIN 1342-1 2003 11 and DIN Technical Report 143, with a value of $\tau$ in PA=0.1-400, and has no sediment when stored at room temperature for 24 h.

16. The composition according to claim 13, which it has an anti-floating effect.

17. A dispersion, millbase, paint, varnish or printing ink, inkjet ink, grinding resin or pigment concentrate, comprising:

the composition according to claim 13.

18. A wetting agent, dispersant, dispersion stabilizer, antistatic agent, rheology additive, or a coating composition; comprising:

the polyaddition compound and/or salt thereof according to claim 1.

* * * * *